(12) United States Patent
Höglund

(10) Patent No.: US 9,791,074 B2
(45) Date of Patent: Oct. 17, 2017

(54) TUBE MODULE

(71) Applicant: ALFA LAVAL CORPORATE AB, Lund (SE)

(72) Inventor: Kasper Höglund, Rönninge (SE)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

(21) Appl. No.: 14/355,115

(22) PCT Filed: Oct. 31, 2012

(86) PCT No.: PCT/EP2012/071561
§ 371 (c)(1),
(2) Date: Apr. 29, 2014

(87) PCT Pub. No.: WO2013/068290
PCT Pub. Date: May 16, 2013

(65) Prior Publication Data
US 2014/0311612 A1    Oct. 23, 2014

(30) Foreign Application Priority Data

Nov. 8, 2011  (EP) ..................................... 11188166

(51) Int. Cl.
| G05D 7/01 | (2006.01) |
| F16L 9/18 | (2006.01) |
| F16L 9/19 | (2006.01) |
| B01J 8/06 | (2006.01) |
| B01J 19/24 | (2006.01) |

(52) U.S. Cl.
CPC ................. F16L 9/19 (2013.01); B01J 8/067 (2013.01); B01J 19/2415 (2013.01); *B01J 2208/00831* (2013.01); *B01J 2219/00772* (2013.01)

(58) Field of Classification Search
CPC ............. F16L 9/19; B01J 8/067; B01J 9/2415
USPC ...................... 138/42, 43, 111, 114
See application file for complete search history.

(56) References Cited

U.S. PATENT DOCUMENTS

| 2,993,682 | A | * | 7/1961 | Huet ............................. 165/110 |
| 3,052,524 | A | | 9/1962 | Clausnitzer et al. |
| 3,299,417 | A | * | 1/1967 | Sibthorpe ..................... 340/605 |
| 3,332,446 | A | * | 7/1967 | Mann ............................. 138/114 |
| 3,730,229 | A | * | 5/1973 | D'Onofrio .................... 138/114 |
| 3,934,618 | A | * | 1/1976 | Henderson .................... 138/114 |
| 4,111,402 | A | * | 9/1978 | Barbini ......................... 366/338 |
| 4,265,235 | A | * | 5/1981 | Fukunaga ................ 128/200.24 |
| 4,570,678 | A | * | 2/1986 | Ziemek ......................... 138/113 |

(Continued)

FOREIGN PATENT DOCUMENTS

| GB | 932048 | 7/1963 |
| GB | 2 201 504 A | 9/1988 |

(Continued)

*Primary Examiner* — Vishal Pancholi
(74) *Attorney, Agent, or Firm* — Birch, Stewart, Kolasch & Birch, LLP

(57) ABSTRACT

A tubular flow module includes at least two concentric tubes with spiral features, wherein first tube is coaxially arranged inside a second tube and each tube has a maximum diameter and a minimum diameter, wherein the maximum diameter of first tube is larger than the minimum diameter of second tube, defining a flow path for fluids between first and second tubes. A tubular flow module system and use of the tubular flow module is also disclosed.

18 Claims, 2 Drawing Sheets

(56) References Cited

U.S. PATENT DOCUMENTS

| | | | |
|---|---|---|---|
| 4,834,172 A | | 5/1989 | Duran |
| 5,107,922 A | | 4/1992 | So |
| 5,393,260 A | * | 2/1995 | Barth .............................. 454/44 |
| RE35,890 E | | 9/1998 | So |
| 7,314,066 B2 | * | 1/2008 | Castillo ........................ 138/114 |
| 2007/0249863 A1 | | 10/2007 | Mitsui et al. |

FOREIGN PATENT DOCUMENTS

| | | |
|---|---|---|
| GB | 2 261 280 A | 5/1993 |
| GB | 2 446 472 A | 8/2008 |
| GB | 2 446 472 B | 10/2009 |
| JP | 48-29046 A | 4/1973 |
| JP | 49-46139 U | 4/1974 |
| JP | 62-62193 A | 3/1987 |
| JP | 62-106834 A | 5/1987 |
| JP | 8-135854 A | 5/1996 |
| JP | 2001-353431 A | 12/2001 |
| JP | 4789893 B2 | 10/2011 |
| JP | 4946139 B2 | 6/2012 |
| SU | 1291173 A1 | 2/1982 |
| WO | WO 2006/064917 A1 | 6/2006 |
| WO | WO 2009/150677 A1 | 12/2009 |

\* cited by examiner

TUBE MODULE

The present invention relates generally to a tube module or a tube module system, and uses of the tube module or the tube module system. The invention particularly relates to a coaxial tube reactor or a coaxial tube reactor system.

BACKGROUND

Tubular reactors have been in use for several years. Examples of such reactors are disclosed by U.S. Pat. No. 3,052,524 and GB932048, which describe a concentric tubular reactor consisting of three tubes, with the heat transfer fluid flowing in the most inner and most outer tubes, and with the reactant fluid flowing in the middle tube. Another example is disclosed by WO 2009150677, which shows a three concentric tube system for catalytic reactions.

Traditional concentric tubular reactors have a constant profile, i.e. the flow path is straight, in both the process and utility sides. This means that the flow within the tubular reactor, on both sides, is often laminar, particularly at lower flow rates, which are commonly employed on the process side when reactions take many seconds up to several minutes to complete.

Operating in the laminar flow regime provides:
Poor Mixing
Poor Heat Transfer (unless the distance between the walls is very small)
Poor Plug Flow This can result in reduced product yield or selectivity of the desired product, and thus the end mixture will contain undesired by-products which need to be separated from the desired product.

THE INVENTION

Accordingly, the present invention finds a solution to the above mentioned problems by providing a tubular flow module or coaxial tube flow module, in particular a coaxial tube reactor or a coaxial tube heat exchanger, which tubular flow module comprises at least two spiral shaped concentric tubes. Thus the present invention relates to a tubular flow module, which flow module comprises at least two concentric tubes with continuous annular spiral features. The concentric tubes may be arranged to each other that one tube, i.e. the second tube, may be coaxially arranged inside the other tube, i.e. the first tube, and each tube has a maximum diameter and a minimum diameter. The maximum diameter of the second tube may be larger than the minimum diameter of the first tube and thus forming a space between the first tube and the second tube. The space is defining a flow path for fluids between first tube and the second tube and the flow path is defined as a combination of an annular spiral flow path and an axially winding flow path.

The first and second concentric tubes having the continuous annular spiral features, i.e. the outer and inner spiral tubes, may be coaxially arranged that a space may be formed between them. Such geometry forces the fluid flow to continuously change direction and hence induces vortices which improves mixing, heat transfer and plug flow. The flow path may thus be defining an annular path for fluids limited by the surfaces and may be shaped as spiral waves. Thus the outer and inner tubes having the spiral features may be engaged like a screw and nut, where the spiral features acts like the threads. The inner spiral tube may be screwed into the outer spiral tube when the tubes are assembled to each other. In the clearance between the spiral features the desired annular winding flow path may be formed.

The tubular flow module may also comprise a tube coaxially arranged outside the first tube. The minimum diameter of the outside tube may be larger or smaller than the maximum diameter of the first tube, and the formed annular space may be defined as the space between the outer tube and the first tube and that the annular space may be for heat transfer fluids or other fluids.

The tubular flow module may also comprise a tube coaxially arranged inside the second tube. The maximum diameter of the inside tube may be smaller or larger than the minimum diameter of the second tube, and the formed annular space may be defined as the space between the inside tube and the second tube and that the annular space may be for heat transfer fluids or other fluids.

The inside tube and the outside tube, respectively, may suitably be selected from the group consisting of cylindrical tubes, corrugated tubes, ribbed tubes, spiral shaped tubes, or tubes with spiral fins.

The tubular flow module may comprise more than two concentric tubes with spiral features coaxially arranged to each other forming more than one annular flow path for fluids.

The flow module may thus have one or more flow paths and one or more annular flow spaces. The annular flow paths may be for process flows, but it is also possible that the annular flow paths may be for heat transfer fluids. The annular flow spaces may be for heat transfer fluids or for process fluids.

The tubular flow module may comprise more than two spiral shaped concentric tubes coaxially arranged to each other forming more than one annular flow path. Also the annular flow spaces, i.e. the flow spaces for heat transfer fluids or for process fluids may be arranged coaxially within the flow module. Each annular flow path and each annular space may have at least one inlet and at least one outlet. Several concentric annular flow paths and annular flow spaces may be within the same flow module, and the tubes may be of any kind of suitable shape and could be selected from the group consisting of cylindrical tubes, corrugated tubes, ribbed tubes, spiral shaped tubes, or tubes with spiral fins.

In the tubular flow module according to the invention the tubes having spiral features may be selected from the group consisting of spiral shape formed walls, or tubes with attached spiral fins. The spiral features have pitch (A), clearance (B) and spiral feature height (C) suitable for obtaining improved plug flow type of flow of fluids in each annular flow path. The annular flow spaces may also have pitch (A), clearance (B) and spiral feature height (C) suitable for obtaining plug flow type of flow of fluids in each annular flow space.

The annular space between a spiral shaped concentric tube and an inside or outside tube may have one or more spacers arranged within the space to secure the flow path and to provide a predesigned distance between the spiral shaped concentric tube and the inner or the outer tube. The flow paths may further be secured by one or more end connection pieces. The tubes of the invention may have locating means to be located with the one or more end connection pieces, and thus position and stabilise the arrangement of tubes. The end connection pieces may have ports for fluids. The ports may be arranged in tangential direction to the flow path, in radial direction to the flow path or in longitudinal alignment, i.e. axial direction, with the tubes on the end connection pieces.

All parts, i.e. tubes having spiral features, inner tubes, outer tubes, and end connection pieces may be mounted together by for example a bolt, but other solutions may be possible such as welding, brazing, hydraulics. One or two nuts may be the means for closing the module together with the bolt. End caps arranged within two end connection pieces could be one way of closing the module either together with the nuts and bolts or without. The end connection piece together with the end cap could be separate pieces or be integrated into one piece depending on how the module may be constructed and closed. One or two springs such as helical springs, disc springs, packs of disc springs, could be used tuned to compensate for thermal expansion and/or as a safety to allow the tubes to open at to high pressures.

The tubular flow module may have one or more access ports or one or more port holes, or combinations thereof, which access ports or port holes may be providing access to the annular flow paths or to the annular spaces. The access ports or the port holes may be inlets for fluids, outlets for fluids or ports for instruments The access ports or the port holes may be arranged tangential, radial, or axial to annular flow paths or to the annular space.

The one or more access ports or one or more port holes, or combinations thereof may be equipped with one or more port fittings. The port fittings may have arrangements for nozzles, for sensor units, for thermo couples, for spring-loaded sensors or for resistance thermometers.

The nozzles, which may be inserted through the port fittings according to the invention, may be selected from any suitable nozzles. Examples of nozzles are injection nozzles, dispersion nozzles, re-dispersion nozzles, re-mixing nozzles, coaxial nozzles, tube nozzles etc.

A coaxial nozzle could be defined as a nozzle with two or more tubes arranged within each other, that a larger tube having a large radius is surrounding a smaller tube having a smaller radius. When such a nozzle is used two or more fluids can be mixed or form dispersions. A re-mixing nozzle could be a tube nozzle having a hole with a nozzle head and the hole has a smaller radius than the tube. The nozzle may be a dispersion nozzle which can have one or more holes at the outlet of the dispersion nozzle and the holes can be arranged in concentric circles or the holes can be arranged in other suitable patterns.

The material of the tubes of the flow module may be selected from the group consisting of stainless steel, iron-based alloys, nickel-based alloys, titanium, titanium alloys, tantalum, tantalum alloys, molybdenum-base alloys, zirconium, zirconium alloys, glass, quartz, graphite, reinforced graphite, Hasteloy, or any other material resistant to the process media. Other suitable material for the tubes are special materials such as plastic material such as PEEK (polyetherether ketone), PPS (polyphenylensulfid), PTFE (polytetrafluoroethylene), perfuorelatomers, or fluorelastomers, PP (polypropene), etc which the tubes could be made of. The different tubes could be of the same material but it is also possible that different tubes may be made of different materials. It could be possible that at least one of the tubes could be made of a membrane material and thus the tube module could have membrane capacity. The tubes could be coated fore instance with catalyst material or any other type of material which has properties suitable for the purpose of the flow module.

The present invention also relates to a tubular flow module system, which tubular flow module system may comprise that at least two tubular flow modules may be connected in series, parallel or combinations thereof to each other. A further alternative may be that the tubular flow module system may be inside or within a shell forming a shell and tube system.

The tubular flow module according to the invention may be used as a reactor for chemical reactions, as a heat exchanger for heat transfer, as a contactor for separations or for extractions, or combinations thereof.

Other aspects and advantages of the invention will, with reference to the accompanying drawings, be presented in the following detailed description of embodiments of the invention. The below figures are intended to illustrate the invention and not to limiting the scope of invention.

DETAILED DESCRIPTION OF THE DRAWINGS

Two concentric spiral shaped tubes 1 and 2 are formed in a way which allows one of them to be engaged in the other. The spirals shape will work as a thread, where outside diameter of the inner tube 2 is larger than the inside diameter of the outer tube 1. In the clearance between the two tubes a space, i.e. a flow path 3 is formed. Flow path 3 forms a spiral shaped path, and also a winding path in both axial and radial direction of tubes 1 and 2.

Figure 1:
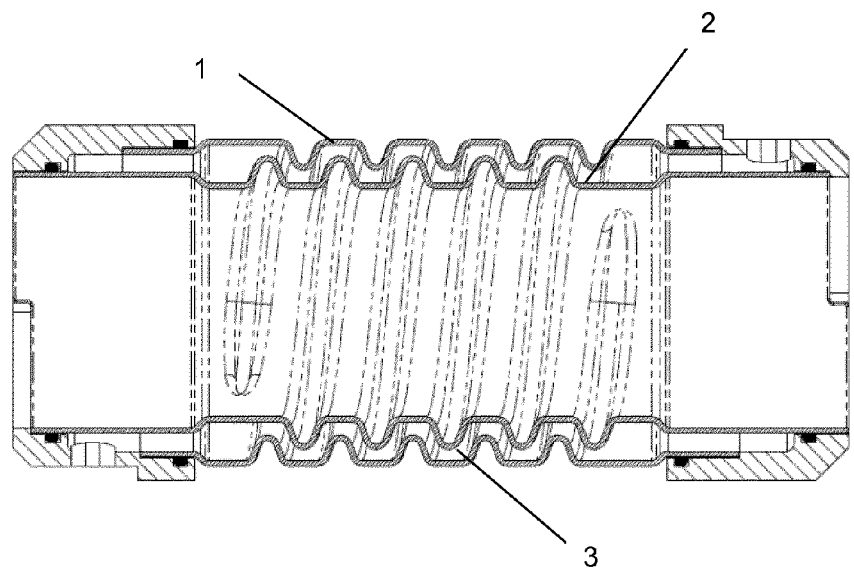
FIG. 1 discloses a flow module of the invention having two spiral shaped tubes.
Figure 2:
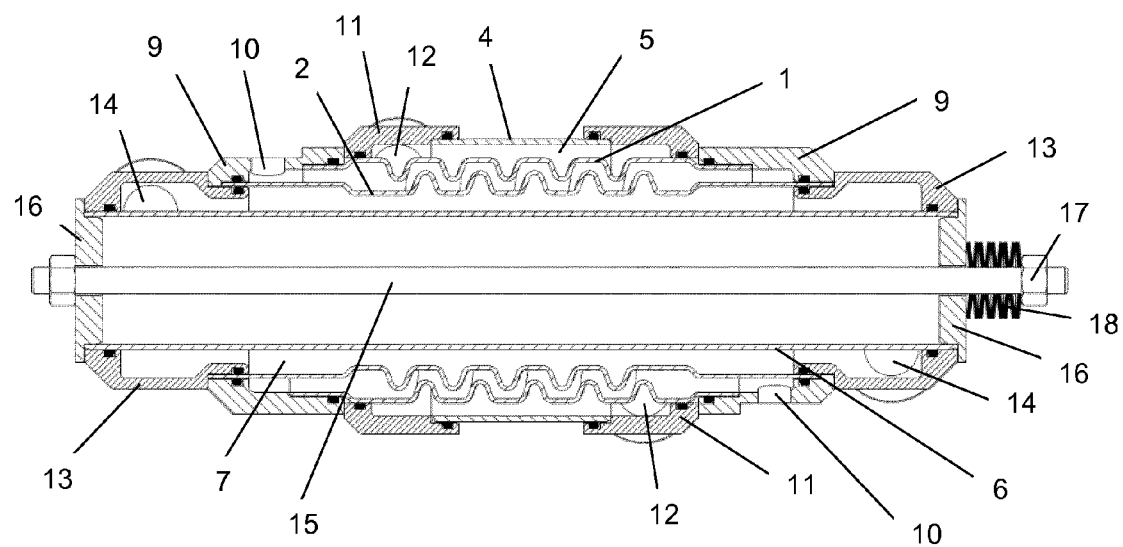
FIG. 2 discloses another embodiment of the invention wherein a flow module has two spiral shaped tubes, and inner and outer tubes forming paths for heat transfer fluids.

The design may suitably be used as a fluid flow path, the fluids may be process fluids or heat transfer fluids. The mean flow direction is in the axial direction. There will also be changing velocities in the radial- and tangential directions of the tube. The size of the velocity components can be tuned by the spirals pitch A clearance B, and feature height C. The velocity changes induce vortices in all directions. This is good for mixing, breaking up of boundary layers and creates improved plug-flow conditions. The ratio of wetted surface to the volume of the space may be adjusted by the clearance between the spirals. These features make the design suitable for flow modules, reactors, heat exchangers etc. The flow of fluid may be of any kind such as liquids, slurries or gas FIG. 2 shows that outer spiral tube 1 may be enclosed in outer tube 4, forming annular space 5 or path for fluids flow, for example heat transfer fluids, between outer spiral tube 1 and outer tube 4. Inner spiral tube 2 may enclose inner tube 6 forming annular space 7 for fluids flow, for example heat transfer fluids, between inner tube 6 and inner spiral tube 2. Tubes 4 and 6 may be straight concentric, i.e. cylindrical tubes, as shown in FIG. 2. Tubes 4 and 6 may be spiral shaped or tubes with spiral fins or tubes 4 and 6 may have any other suitable shape, such as corrugated, ribbed tubes or any other shape that fits inside or outside the spiral tubes, i.e. tubes 1 and 2, other types shapes of tubes 4 and 6 than the cylindrical shape are not shown in FIG. 2.

Annular spaces 5 and 7 may be equipped with one or more spacers, said spacers are not shown in FIG. 2, between outer cylindrical tube 4 and outer spiral tube 1, and inner cylindrical tube 6 and inner spiral tube 2 respectively. The spacers could be used for the purpose of reinforcement, for alignment, as mixing enhancing elements, or as fixing sites.

Spiral tubes 1 and 2 are located to each other in both axial and tangential direction in each end by an end connection piece 9. Locating means are integrated in the mating parts. Spiral tubes 1 and 2 and end connection pieces 9 seal against each other by means of a replaceable seal, i.e. O-ring, etc. or a permanent seal, i.e. weld, braze, etc. End connection pieces 9 has one or more ports 10 for connecting to a fluid line or an instrument like for example a thermocouple or a pressure transducer.

Outer tube 4 and outer spiral tube 1 are sealed by end connection pieces 11. No tangential location is needed for this case with a cylindrical tube 4. End connection piece 11 has one or more ports 12 for connecting to a fluid line or an instrument like for example a thermocouple or a pressure transducer. Ports 12 may be arranged in a tangential direction to spiral shaped tube 1 in the direction which guides the fluid in the preferred direction.

Inner tube 6 and inner spiral tube 2 are sealed by end connection pieces 13. No tangential location is needed for this case with cylindrical tube 6. End connection piece has one or more ports 14 for connecting to a fluid line or an instrument like for example a thermocouple or a pressure transducer. Ports 14 may be arranged in a tangential direction to the spiral shaped tube 2 in the direction which guides the fluid in the preferred direction. All seals are to ambient and not between the flow paths or annular spaces 3, 5 and 7 to minimize risk of cross contamination.

All parts, i.e. spiral tubes 1 and 2, cylindrical tubes 4 and 6, and end connection pieces 9, 11 and 13 are held together by a bolt 15, nuts 17, end caps 16 and disc spring packs 18. Disc springs 18 may be tuned to compensate for thermal expansion effects or/and as a safety feature or device to allow the tubes to open at too high pressures.

Several units forming a flow module system may be connected together. Ports 10, 12, and 14 maybe connected in between the units or in manifolds.

Figure 3:
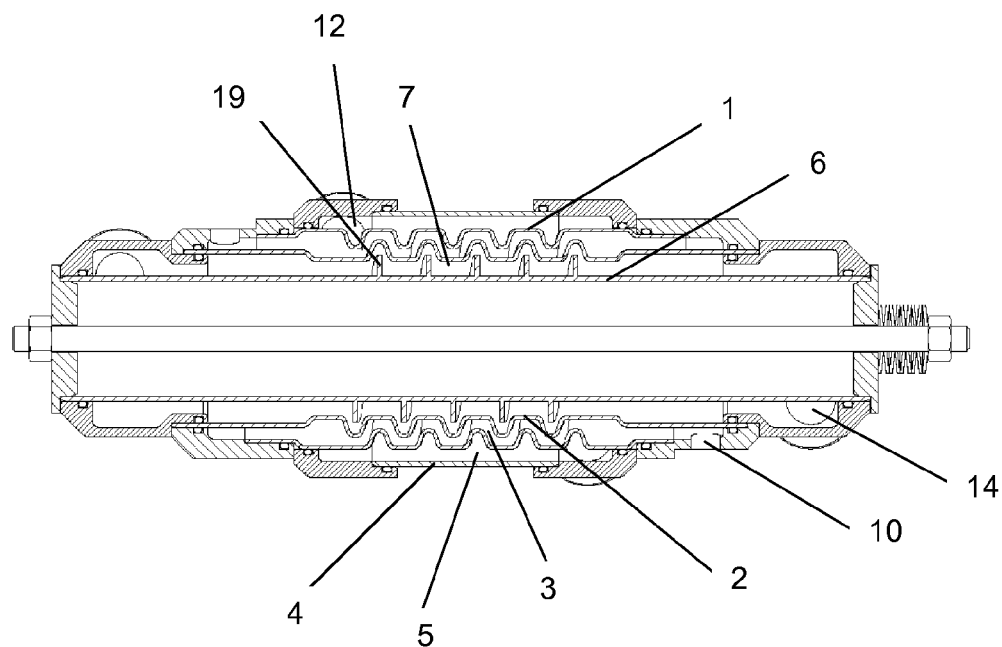
FIG. 3 discloses further embodiment of the invention wherein a flow module has two spiral shaped tubes, and inner and outer tubes forming paths for heat transfer fluids.

FIG. 3 is showing a tubular flow module wherein space 7 between spiral tube 2 and cylindrical tube 6 has been equipped with mixing enhancing element 19 arranged on cylindrical tube 6. Mixing enhancing element 19 could be a thread 19 or spiral fins 19 which follow the spiral shape of spiral tube 2. A corresponding arrangement could be created in space 5 between cylindrical tube 4 and spiral tube 1, this is not seen in FIG. 3. Ports 10, 12, and 14, are inlets of fluids, outlets of fluids or ports for instruments. In FIG. 3 ports 10, 12, and 14, are arranged tangential or radial to annular flow path 3 or to annular spaces 5 and 7, but other alternatives are possible. One possible arrangement of ports would be to arrange the ports axial to the flow paths or the flow spaces, this is not seen in FIG. 3.

Figure 4:
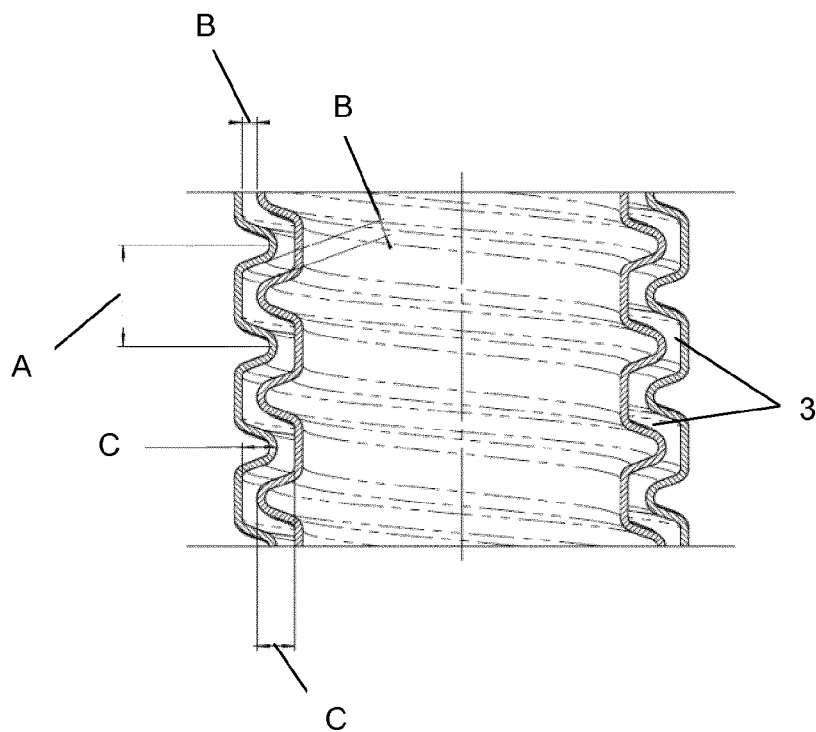
FIG. 4 discloses pitch, clearance and spiral feature height of tubes.

FIG. 4 is showing the relationship of pitch A, clearance B and spiral feature height C of spiral tubes. Pitch A, clearance B and spiral feature height C is also applicable for cylindrical tubes, which have spiral fins 19 arranged to enhance mixing within flow spaces 5 and 7. FIG. 4 does not disclose this. Pitch A, clearance B and spiral feature height C could also promote plug flow type of flow of fluids in each annular flow path 3 and flow spaces 5 and 7.

The flow module of the present invention is useful when undertaking the following process operations; manufacturing, reactions, mixing, blending, doing cryogenic operations, washing, extractions and purifications, pH adjustment, solvent exchanges, manufacturing of chemicals, manufacturing of intermediate chemicals, manufacturing API (active pharmaceutical ingredients) when working with low temperature operations, manufacturing of pharmaceutical intermediates, scale-up and scale-down developments, precipitation or crystallisations, performing multiple injections or multiple additions or multiple measurements or multiple samplings, working with multistep reactions, pre-cooling operations, preheating operations, post-heating and post-cooling operations, processes for converting batch processes to continuous processes, and operations for dividing and recombining flows.

Reaction types which can be preformed in the present invention include addition reactions, substitution reactions, elimination reactions, exchange reactions, quenching reactions, reductions, neutralisations, decompositions, replacement or displacement reactions, disproportionation reactions, catalytic reactions, cleaving reactions, oxidations, ring closures and ring openings, aromatization and dearomatization reactions, protection and deprotection reactions, phase transfer and phase transfer catalysis, photochemical reactions, reactions involving gas phases, liquid phases and solid phases, and which may involve free radicals, electrophiles, neucleophiles, ions, neutral molecules, etc.

Synthesis such as amino acid synthesis, asymmetric synthesis, chiral synthesis, liquid phase peptide synthesis, olefin metathesis, peptide synthesis, etc. can also be carried out with the flow module. Other types of synthesis in which the flow module can be used are reactions within carbohydrate chemistry, carbon disulfide chemistry, cyanide chemistry, diborane chemistry, epichlorohydrin chemistry, hydrazine chemistry, nitromethane chemistry, etc. or synthesis of heterocyclic compounds, of acetylenic compounds, of acid chlorides, of catalysts, of cytotoxic compounds, of steroid intermediates, of ionic liquids, of pyridine chemicals, of polymers, of monomers, of carbohydrates, of nitrones etc.

The flow module is suitable for name reactions such as Aldol condensations, Birch reductions, Baeyer-Villiger oxidations, Curtius rearrangements, Dieckmann condensations, Diels-Alder reactions, Doebner-Knoevenagel condensations, Friedel-Crafts reactions, Fries rearrangements, Gabriel synthesis, Gomberg-Bachmann reactions, Grignard reactions, Heck reactions, Hofmann rearrangements, Japp-Klingemann reactions, Leimgruber-Batcho indole synthesis, Mannich reactions, Michael additions, Michaelis-Arbuzov reactions, Mitsunobu reactions, Miyaura-Suzuki reactions, Reformatsky reactions, Ritter reactions, Rosenmund reductions, Sandmeyer reactions, Schiff base reductions, Schotten-Baumann reactions, Sharpless epoxidations, Skraup synthesis, Sonogashira couplings, Strecker amino acid synthesis, Swern oxidations, Ullmann reactions, Willgerodt rearrangements, Vilsmeier-Haack reactions, Williamson ether synthesis, Wittig reactions etc.

Further reactions which the flow module is suitable for are condensation reactions, coupling reactions, saponifications, ozonolysis, cyclization reactions, cyclopolymerization reactions, dehalogenations, dehydrocyclizations, dehydrogenations, dehydrohalogennations, diazotizations, dimethyl sulphate reactions, halide exchanges, hydrogen cyanide reactions, hydrogen fluoride reactions, hydrogenation reactions, iodination reactions, isocyanate reactions, ketene reactions, liquid ammonia reactions, methylation reactions, coupling, organometallic reactions, metalation, oxidation reactions, oxidative couplings, oxo reactions, polycondensations, polyesterifications, polymerization reactions, other reaction such as acetylations, arylations, acrylations, alkoxylations, ammonolysis, alkylations, allylic brominations, aminations, aminations, azidations, benzoylations, brominations, butylations, carbonylations, carboxylations, chlorinations, chloromethylations, chlorosulfonations, cyanations, cyanoethylations, cyano-methy-lations, cyanurations, epoxidations, esterifications, etherifications, halogenations, hydroformylations, hydrosilylations, hydroxylations, ketalizations, nitrations, nitro-methylations, nitrosations, peroxidations, phosgenations, quaternizations, silylations, sulfochlorinations, sulfonations, sulfoxidations, thiocarbonylations, thiophosgenations, tosylations, transaminations, transesterifications, etc.

The above description is not limited to the mentioned embodiments of the invention but to a person skilled in the art there are several modifications possible within the scope of the claimed invention.

The invention claimed is:

1. A tubular flow module comprising:
at least two concentric tubes with continuous annular spiral features,
wherein a first of the concentric tubes is coaxially arranged inside a second of the concentric tubes and each of the concentric tubes has a maximum diameter and a minimum diameter,
wherein a maximum diameter of the first tube is larger than a minimum diameter of the second tube forming a first space between the first tube and the second tube,
wherein the first space defines a flow path for fluids between the first tube and the second tube,
a first end connection piece extending between the first tube and the second tube, the first end connection piece forming a first end;
a second end connection piece extending between the first tube and the second tube, the second end connection piece forming a second end;
a first inlet port to the first space, the first inlet port formed axially inward from the first end;
a first outlet port from the first space, the first outlet port formed axially inward from the second end,
a third tube coaxially arranged outside the second tube,
wherein a minimum diameter of the third tube is larger than the maximum diameter of the second tube,
wherein a second space is defined between the third tube and the second tube, the second space being for heat transfer fluids or other fluids, and
a third end connection piece extending between the third tube and the second tube, the third end connection piece forming a third end.

2. A tubular flow module comprising:
at least two concentric tubes with continuous annular spiral features,
wherein a first of the concentric tubes is coaxially arranged inside a second of the concentric tubes and each of the concentric tubes has a maximum diameter and a minimum diameter,
wherein a maximum diameter of the first tube is larger than a minimum diameter of the second tube forming a first space between the first tube and the second tube,
wherein the first space defines a flow path for fluids between the first tube and the second tube,
a first end connection piece extending between the first tube and the second tube, the first end connection piece forming a first end;
a second end connection piece extending between the first tube and the second tube, the second end connection piece forming a second end;
a first inlet port to the first space, the first inlet port formed axially inward from the first end;
a first outlet port from the first space, the first outlet port formed axially inward from the second end;
a third tube coaxially arranged inside the first tube,
wherein a maximum diameter of the third tube is smaller than the minimum diameter of the first tube,
wherein a second space is defined between the third tube and the first tube, the second space being for heat transfer fluids or other fluids,
a third end connection piece extending between the third tube and the first tube, the third end connection piece forming a third end;
a fourth end connection piece extending between the third tube and the first tube, the fourth end connection piece forming a fourth end;
a second inlet port to the second space, the second inlet port formed axially inward from the third end; and
a second outlet port from the second space, the second outlet port formed axially inward from the fourth end.

3. The tubular flow module according to claim 1, wherein the third tube is selected from the group consisting of cylindrical tubes, corrugated tubes, ribbed tubes, spiral shaped tubes, or tubes with spiral fins.

4. The tubular flow module according to claim 1, wherein the tubular flow module comprises more than two concentric tubes with spiral features coaxially arranged with respect to each other forming more than one annular flow path for fluids.

5. The tubular flow module according to claim 1, wherein the at least two concentric tubes having continuous annular spiral features are selected from the group consisting of spiral shaped formed walls and tubes with attached spiral fins.

6. The tubular flow module according to claim 5, wherein the continuous annular spiral features have pitch, clearance and spiral feature heights suitable for forming each flow path.

7. The tubular flow module according to claim 1, wherein the flow path defines an annular flow path for fluids and is limited by surfaces of the at least two concentric tubes, and the surfaces are shaped as spiral waves and act like threads when assembled.

8. A tubular flow module system comprising at least two tubular flow modules according to claim 1, wherein the tubular flow modules are connected in series, parallel or combinations thereof to each other.

9. The tubular flow module system according to claim 8, wherein the tubular flow module system is inside a shell forming a shell and tube system.

10. The tubular flow module according to claim 2, wherein the third tube is selected from the group consisting of cylindrical tubes, corrugated tubes, ribbed tubes, spiral shaped tubes, or tubes with spiral fins.

11. The tubular flow module according to claim 1, further comprising:
a fourth tube coaxially arranged inside the first tube, wherein a maximum diameter of the fourth tube is smaller than the minimum diameter of the first tube, wherein a third space is defined between the fourth tube and the first tube, the third space being for heat transfer fluids or other fluids;
a fifth end connection piece extending between the fourth tube and the first tube, the fifth end connection piece forming a fifth end;
a sixth end connection piece extending between the fourth tube and the first tube, the sixth end connection piece forming a fourth end;
a third inlet port to the third space, the third inlet port formed axially inward from the fifth end; and
a third outlet port from the third space, the third outlet port formed axially inward from the sixth end.

12. The tubular flow module according to claim 2, wherein a wall of the third tube is free from apertures along an entire length thereof.

13. The tubular flow module according to claim 11, wherein a wall of the fourth tube is free from apertures along an entire length thereof.

14. The tubular flow module according to claim 1, wherein the first inlet port is formed in the first connection piece and the first outlet port is formed in the second connection piece.

15. The tubular flow module according to claim 1, wherein a length of the first tube is greater than a length of the second tube.

16. The tubular flow module according to claim 1, wherein a length of the third tube is less than a length of the second tube.

17. The tubular flow module according to claim 2, wherein a length of the third tube is greater than a length of the first tube.

18. The tubular flow module according to claim 1, wherein a length of the first tube is greater than a length of the second tube, and
    wherein each of the first connection piece and second connection piece comprises a first radially extending portion contacting an outer surface of the first tube and a second axially extending portion containing an outer surface of the second tube.

\* \* \* \* \*